(12) United States Patent
Levin et al.

(10) Patent No.: US 11,257,513 B1
(45) Date of Patent: Feb. 22, 2022

(54) DATA REMOVAL DRILL DEVICE AND METHOD TO USE

(71) Applicants: Simon Levin, Jacksonville, FL (US); Michael Koufos, Jacksonville, FL (US)

(72) Inventors: Simon Levin, Jacksonville, FL (US); Michael Koufos, Jacksonville, FL (US)

( * ) Notice: Subject to any disclaimer, the term of this patent is extended or adjusted under 35 U.S.C. 154(b) by 0 days.

(21) Appl. No.: 16/998,718

(22) Filed: Aug. 20, 2020

(51) Int. Cl.
| | |
|---|---|
| *G11B 5/024* | (2006.01) |
| *B23B 41/00* | (2006.01) |
| *G11B 23/50* | (2006.01) |
| *B23K 26/382* | (2014.01) |
| *G06F 21/88* | (2013.01) |
| *B23B 49/00* | (2006.01) |
| *B23Q 17/24* | (2006.01) |
| *B23Q 17/00* | (2006.01) |
| *G06F 21/00* | (2013.01) |

(52) U.S. Cl.
CPC ............ *G11B 5/0245* (2013.01); *B23B 41/00* (2013.01); *B23B 49/00* (2013.01); *B23K 26/382* (2015.10); *B23Q 17/006* (2013.01); *B23Q 17/2409* (2013.01); *G06F 21/00* (2013.01); *G06F 21/88* (2013.01); *G11B 23/50* (2013.01)

(58) Field of Classification Search
None
See application file for complete search history.

(56) References Cited

U.S. PATENT DOCUMENTS

| | | | |
|---|---|---|---|
| 2,838,966 A | 6/1958 | Campbell | |
| 4,257,166 A | 3/1981 | Barker et al. | |
| 5,590,986 A | 1/1997 | Juang | |
| 5,853,270 A * | 12/1998 | Salley | B23B 47/28 408/87 |
| 7,189,034 B1 | 3/2007 | Zeilinger et al. | |
| 8,794,559 B1 * | 8/2014 | Olliges | B30B 1/32 241/243 |
| 9,488,452 B1 * | 11/2016 | Daniels | F42B 5/18 |

(Continued)

FOREIGN PATENT DOCUMENTS

CN 204883723 U * 8/2015

OTHER PUBLICATIONS

CN 214185361 U, Sep. 2021, China, Kunshan Tujia Electronic.*

*Primary Examiner* — Jefferson A Evans
(74) *Attorney, Agent, or Firm* — Mitchell Ghaneie; Christopher Roberts

(57) ABSTRACT

This unique and novel invention provides a custom data removal jig used to reliably, efficiently, and cost-effectively remove data from a handheld mobile computing device ("PC device"). The data removal jig comprises an open-box structure which provides one or more alignment features to assist with properly inserting the PC device within the data removal jig. Additionally, a pilot hole is provided by the securement structure. Once the PC device is inserted into the data removal jig, the pilot hole is substantially centered above the integrated flash memory chip on the particular PC device's motherboard which the data removal jig has been customized to accommodate. A power drill is used to precisely penetrate the PC device via the pilot hole and substantially isolate the damage to the integrated flash memory chip. Additionally, the securement structure also provides one or more braces that assist with restraining movement of the securement structure during the data removal process.

21 Claims, 8 Drawing Sheets

(56) References Cited

U.S. PATENT DOCUMENTS

| | | | | |
|---|---|---|---|---|
| 9,782,836 | B2* | 10/2017 | Spishak | G05D 1/0261 |
| 2006/0219829 | A1* | 10/2006 | Smith, III | B02C 1/005 |
| | | | | 241/168 |
| 2008/0206005 | A1* | 8/2008 | Sherlock | B23B 47/28 |
| | | | | 408/103 |
| 2011/0210720 | A1* | 9/2011 | Corry | G01D 5/145 |
| | | | | 324/207.13 |
| 2012/0328381 | A1* | 12/2012 | Schmidt | B25F 5/021 |
| | | | | 408/1 R |
| 2014/0263216 | A1* | 9/2014 | Clark | B23B 35/00 |
| | | | | 219/121.71 |
| 2018/0236459 | A1* | 8/2018 | Clark | G06F 21/80 |
| 2018/0264559 | A1* | 9/2018 | Clark | B23C 3/04 |
| 2021/0018137 | A1* | 1/2021 | Chapuis | F16M 11/04 |

* cited by examiner

DATA REMOVAL DRILL DEVICE AND METHOD TO USE

BACKGROUND OF THE INVENTION

A. Field of the Invention

This invention relates to a device and method for removing data from a mobile personal computing device.

B. Prior Art

Rapid technological advancement and decreased manufacturing costs have driven production of mobile personal computing devices to unprecedented levels. As a result of the widespread proliferation of mobile personal computing devices, such as smartphones and tablets, a surplus of electronic waste ("e-waste") is being generated at an increasing rate. An actively evolving e-waste recycling industry has developed supply chains that redirect some of the e-waste, including mobile personal computing devices, from being disposed of within landfills. However, e-waste often includes data from prior use and, as such, many regulatory agencies have required that such data be removed prior to recycling or salvaging the e-waste.

While there have been several attempted solutions for addressing the removal of personal data from mobile personal computing devices, many attempted solutions, if not all, are rudimentary and require nearly all components of the phone to be destroyed. Consequently, existing data removal devices and methods failed to provide a solution that is reliable, efficient, and cost-effective.

BRIEF SUMMARY OF THE INVENTION

An exemplary embodiment of the present invention provides a custom data removal jig used to reliably, efficiently, and cost-effectively remove data from a handheld mobile computing device ("PC device"). The data removal jig forms an open-box structure. The open-box structure comprises a plurality of sides, which include a top side, bottom side, rear side, and front side. The top side provides a pilot hole that is substantially centered above the integrated flash memory chip on the PC device's motherboard when the PC device is properly inserted into the data removal jig. The top side also provides a camera alignment hole to assist with properly inserting the PC device into the insert opening.

A drill press is then used to precisely penetrate a drill bit into the PC device such that the drill bit destroys, and thereby removes, the integrated flash memory without substantially damaging a significant number of other components of the PC device. The bottom side provides at least one lateral brace that assists in restraining the data removal jig from translating while the drill bit is penetrating the PC device. It is anticipated that alternative embodiments of the data removal jig may provide a bottom side that additionally provides one or more torsional braces to assist in restraining torsional forces arising while the drill bit penetrates the PC device.

The front side provides an insert opening that allows for the PC device to be inserted within the data removal jig. It is anticipated that alternative embodiments of the data removal jig may provide an insert opening that further provides a slotted recess. The slotted recess allows the data removal jig to accommodate PC devices that comprise a camera lens which protrudes relative to the rear surface of the PC device. Proper insertion of the PC device into the insert opening allows for the pilot hole to be substantially centered above the integrated flash memory chip on the PC device's motherboard.

After properly inserting the PC device into the data removal jig, the pilot hole can assist in precisely guiding the drill bit into the PC device. The drill bit penetrates the PC device at a predetermined depth and permanently damages the integrated flash memory chip, thereby destroying any data stored within the PC device. Furthermore, such accurate targeting of the PC device's integrated flash memory chip allows for a majority of the PC device's components to be unaffected by the data removal process and remain in a potentially salvageable condition.

The thickness of the bottom side of the data removal jig is substantially consistent among all embodiments of data removal jigs. Consistent thickness of the bottom side provides added efficiency when using the data removal jig with the drill press. The drill press provides a table, which can be raised or lowered relative to the drill bit. Thus, after properly adjusting the height of the table, the drill press can be used with the data removal jig to reliably and efficiently drill into a variety of PC devices at substantially the predetermined depth.

NUMBERING REFERENCE

5—Data removal jig
11—First insert opening
13—Slotted recess
15—Camera alignment hole
20—Pilot hole
25—Lateral brace
26—Torsional brace 50—Handheld mobile computing device
51—Camera lens
60—Drill press
61—Drill bit
62—Table
110—Open-box securement structure
210—Open-ended tubular securement structure
212—Second insert opening

DETAILED DESCRIPTION OF THE EMBODIMENTS

A non-limiting exemplary embodiment of the present invention provides a custom data removal jig 5 used to reliably, efficiently, and cost-effectively remove data from a handheld mobile computing device 50 ("PC device" 50). The data removal jig 5 comprises a securement structure which may be formed by a variety of geometric configurations, but preferably forms a hollow rectangular prism. Furthermore, the securement structure is preferably comprised of a rigid material, but may alternatively be comprised of a flexible material.

The securement structure provides a plurality of sides, which include a top side, a bottom side, a rear side, a front side, and a pair of end sides. The top side, bottom side, and each end side of the pair of end sides respectively comprise an interior surface and exterior surface. The respective distance between the interior surface and the exterior surface, defines the thickness of the respective side. The heights of the front side, rear side, and pair of end sides are substantially equal and are defined by the distance between the interior surface of the top side and the interior surface of the bottom side.

Figure 1:
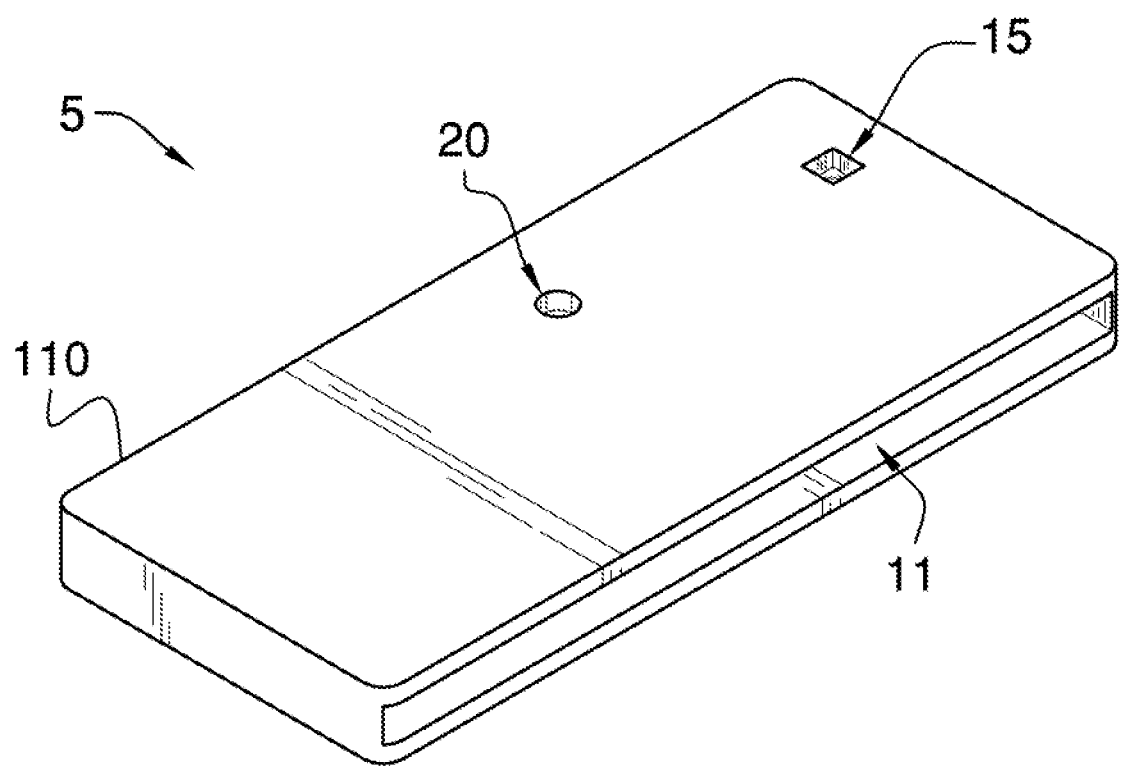
FIG. 1 is a top isometric view of a first embodiment of the data removal jig.
Figure 2:
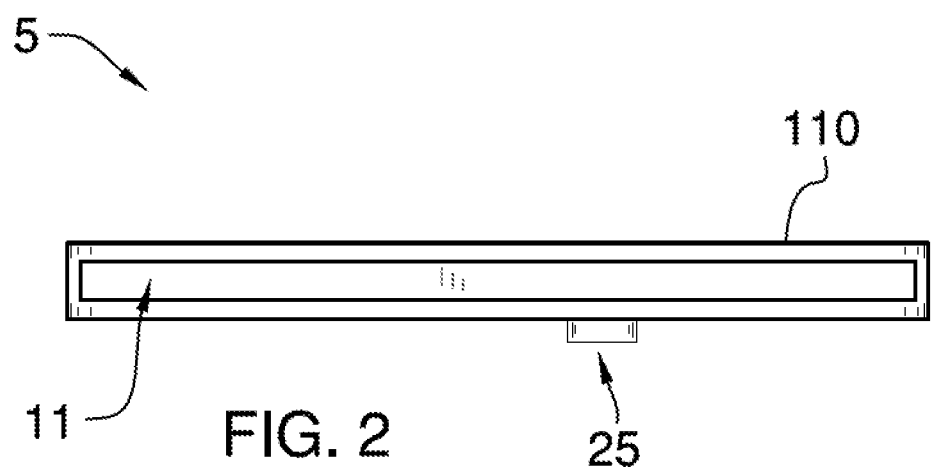
FIG. 2 is a front side view of the first embodiment of the data removal jig.
Figure 3:
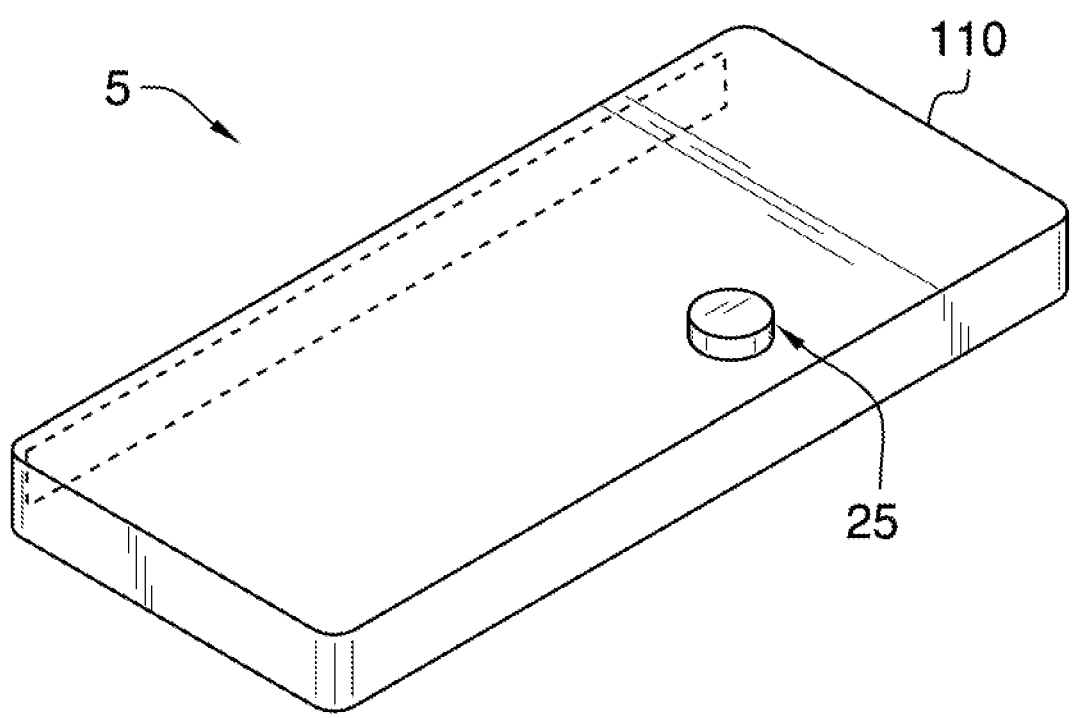
FIG. 3 is a bottom isometric view of the first embodiment of the data removal jig.
Figure 4:
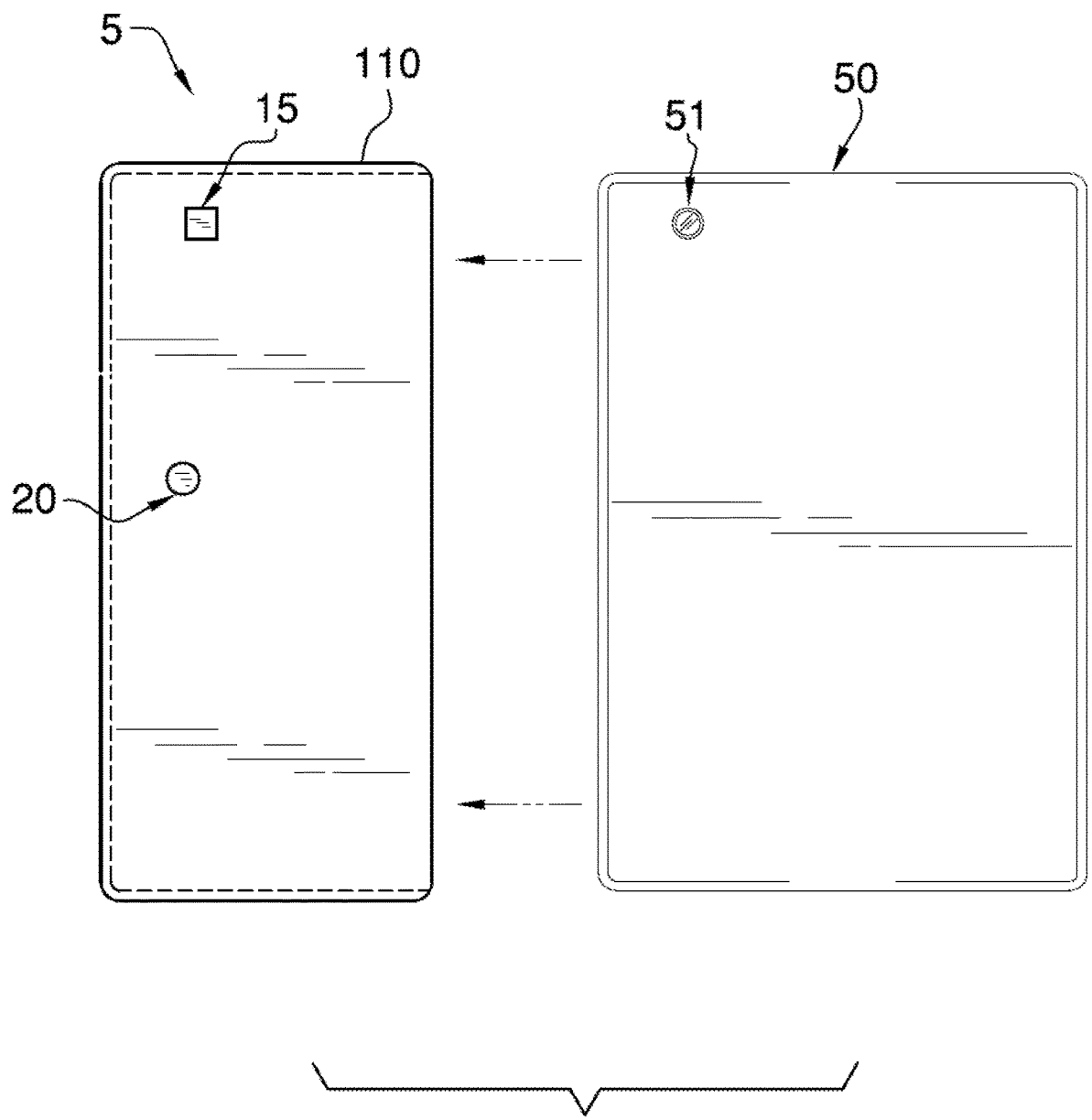
FIG. 4 is a top view of the first embodiment of the data removal jig for a handheld mobile computing device illustrating how the handheld mobile personal computing device is inserted into an insert opening provided by the data removal jig.
Figure 5:
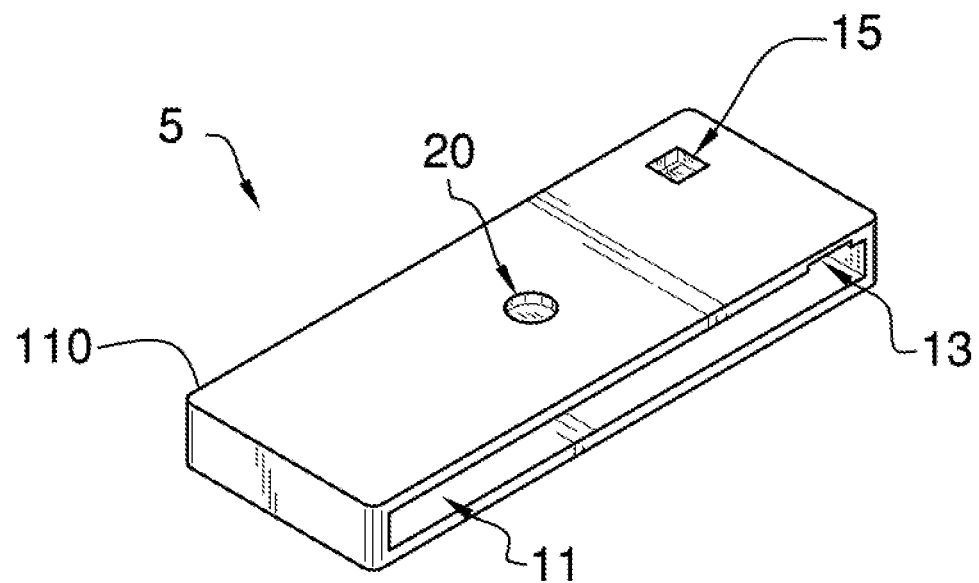
FIG. 5 is a top isometric view of the first embodiment of the data removal jig providing a slotted recess and plurality of torsional braces.
Figure 6:
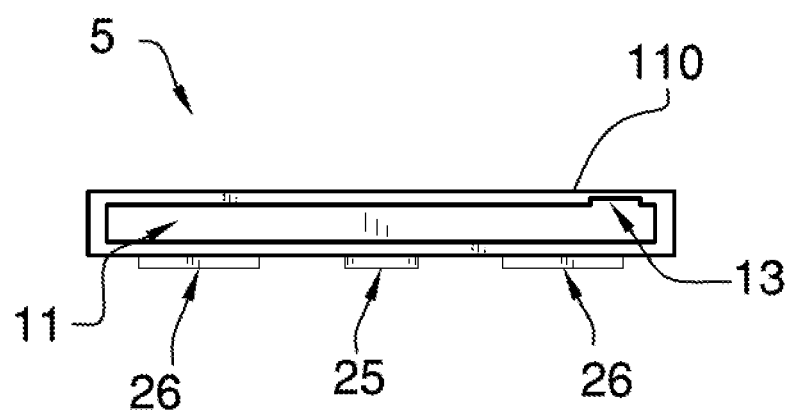
FIG. 6 is a front side view of the first embodiment of the data removal jig providing the slotted recess and plurality of torsional braces.

Each end side of the pair of end sides respectively span from the front side to the rear side. Each end side of the pair of end sides substantially span within planes which are substantially parallel to each other. Each of the end sides span substantially equal lengths relative to each other. Additionally, each of the end sides are respectively connected to both the top side and the bottom side, as shown in FIGS. 1 and 2.

The top side and bottom side each substantially span within substantially parallel planes that are offset from each other. The exterior widths of the top side and bottom side are substantially equal and are substantially defined by the distance between the exterior surfaces of the front and rear sides. The exterior lengths of the top and bottom sides are substantially equal and are defined by the distance between the exterior surfaces of the pair of end sides.

The front and rear sides substantially span within parallel planes that are offset from each other. The exterior spans of the front and rear sides are of substantially equal lengths and are substantially defined by the distance between the interior surfaces of the pair of end sides. The lengths of the front and rear sides are also substantially equal to the height of the PC device 50 which the data removal jig 5 is customized to accommodate. Additionally, the distance between the interior surfaces of the top and bottom sides substantially equal to or greater than the thickness of the PC device 50 which the data removal jig 5 is customized to accommodate.

The space created by the separation between the interior surfaces of the pair of end sides and the separation between the interior surfaces of the top and bottom sides form an interior void within the securement structure. Accordingly, the data removal jig 5 is customized to allow the PC device 50 to friction fit, either partially or entirely, in the interior void of the securement structure, such that the interior surfaces of the top side, bottom side, and each of the end sides are substantially in contact with the PC device 50.

Referring to FIGS. 1, 5, 8, and 11, the top side of the securement structure provides a camera alignment hole 15 and a pilot hole 20. The camera alignment hole 15 and the pilot hole each extend through the entire thickness of the top side. The locations of the pilot hole 20 and camera alignment hole 15 are predetermined and depend on the particular PC device 50 that the data removal jig 5 is designed to accommodate.

It is anticipated that the top side may further provide a slotted recess 13. The slotted recess 13 extends from the interior surface towards the exterior surface, thereby reducing the thickness of a portion of the top side. The slotted recess 13 allows the securement structure to efficiently accommodate PC devices 50 which include a camera lens 51 that protrudes outward from the PC device 50. The slotted recess 13 has a predetermined width such that it accommodates the size of the camera lens 51 of the PC device 50. The slotted recess 13 is aligned with the camera alignment hole 15 and spans substantially parallel relative to the span of the pair of end sides.

Additionally, it is anticipated that one or more secondary slotted recesses (not shown) may be provided by either end side of the pair of end sides to further accommodate additional protrusions that the PC device 50 may provide. Each secondary slotted recess would reduce the thickness of a portion of the respective end side providing the secondary slotted recess. The secondary slotted recess would span substantially parallel to the span of the end sides as well as the span of the slotted recess 11.

Each PC device 50 provides a display screen and a motherboard. The motherboard provides a plurality of microchips, including an integrated flash memory chip. The pilot hole 20 is substantially centered above the integrated flash memory chip. It is common for different PC devices 50 to provide motherboards with different designs and layouts, which, consequently, may vary the location of the integrated flash memory chip.

A power drill provides a drill bit 61. The drill bit 61 is inserted into the pilot hole 20, after the power drill is activated, and is used to precisely and accurately penetrate the PC device 50 such that the integrated flash memory chip is destroyed without substantially damaging the display screen or a plurality of other internal components provided by the PC device 50. The power drill preferably comprises a drill press 60.

Figure 7:
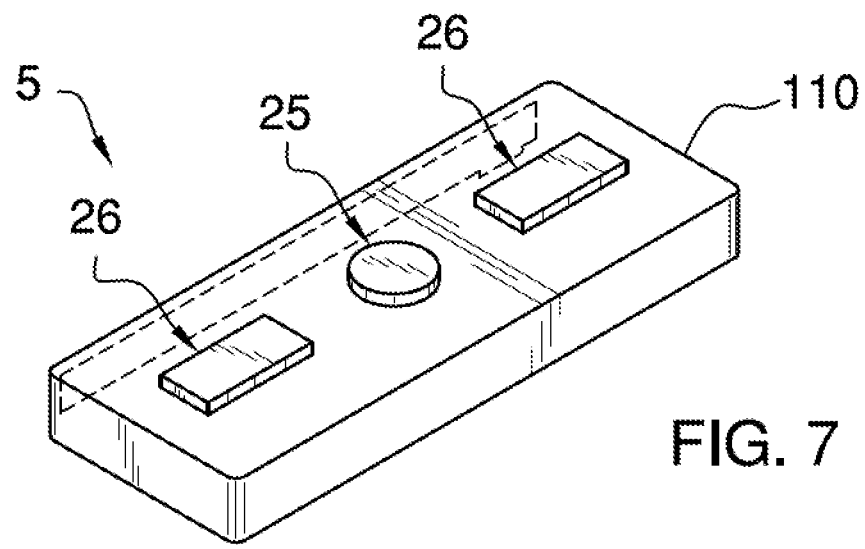
FIG. 7 is a bottom isometric view of the first embodiment of the data removal jig providing the slotted recess and plurality of torsional braces.

The thickness of the bottom side of the securement structure is predetermined among all embodiments of data removal jigs 5 to improve the efficiency of the data removal process when using the drill press 60. The bottom side preferably provides at least one lateral brace 25 which assists in restraining the data removal jig 5 from translating on a table of the drill press 60 while the drill bit 61 is penetrating the PC device 50. It is anticipated that the bottom side of the securement structure may additionally provide one or more torsional braces 26 to assist in restraining torsional forces arising while data removal jig 5 is placed on the table 62 of drill press 60 when the drill bit penetrates the PC device 50. The profile of the lateral and torsional braces 25, 26 may be of varying geometries. Referring to FIG. 7, the profile of the lateral brace 25 is cylindrical while the profile of the torsional braces 26 are rectangular prisms.

The table 62 of the drill press 60 provides a, can be raised or lowered relative to the drill bit 61. Thus, after properly adjusting the height of the table 62, the drill press 60 can then be used to reliably and efficiently drill into a variety of PC devices 50 at a substantially predetermined depth.

The data removal jig 5 requires the PC device 50 to be oriented such that when it is properly inserted within the interior void its display screen is adjacent to the interior surface of the bottom side and its camera lens 51 is substantially aligned with the camera alignment hole 15. Upon inserting the PC device 50 within the interior void of the data removal jig 5 and aligning the camera lens 51 with the camera alignment hole 15, the pilot hole 20 will be substantially centered above the integrated flash memory chip. Once the camera alignment hole 15 is substantially aligned with the camera lens 51, the pilot hole 20 can then be used to precisely guide the drill bit 61 into the PC device 50. Upon activating the drill press 60 the drill bit 61 is lowered through the pilot hole 20 such that it penetrates the PC device 50. The drill bit 61 penetrates the PC device 50 at the predetermined depth which ensures the integrated flash memory chip is permanently damaged, thereby destroying the data stored within the PC device 50. Such precise and accurate targeting of the PC device's 50 integrated flash memory chip allows for the display screen and the majority of other internal components of the PC device 50 to be unaltered by the data removal process and thus, potentially salvageable. After the drill bit 61 has been raised and the drill press 60 has been deactivated the PC device 50 may be removed from the securement structure and is now ready to be recycled or salvaged for parts.

First Embodiment

In a first embodiment of the present invention the geometric configuration of the securement structure forms an open-box structure 110, as shown in FIGS. 1-7. The open-box structure 110 comprises the plurality of sides, wherein the front side provides a first insert opening 11. It is anticipated that the rear side or either of the end sides may alternatively provide the first insert opening 11. The insert opening 11 provides access to the interior void. The height and width of the first insert opening 11 are substantially equal to the height and width of the side which provides the first insert opening 11, respectively. In the first embodiment of the present invention the front side provides the first insert opening 11, as shown in FIGS. 1-7. Each side, with the exception of the side that provides the first insert opening 11, preferably comprises a substantially uniform thickness, relative to one another, to bolster structural rigidity of the open-box structure 110 and prevent distortion and plastic deformation. However, it is anticipated that the open-box structure 110 may alternatively provide a plurality of negative spaces along the internal and external surfaces.

Second Embodiment

Figure 8:
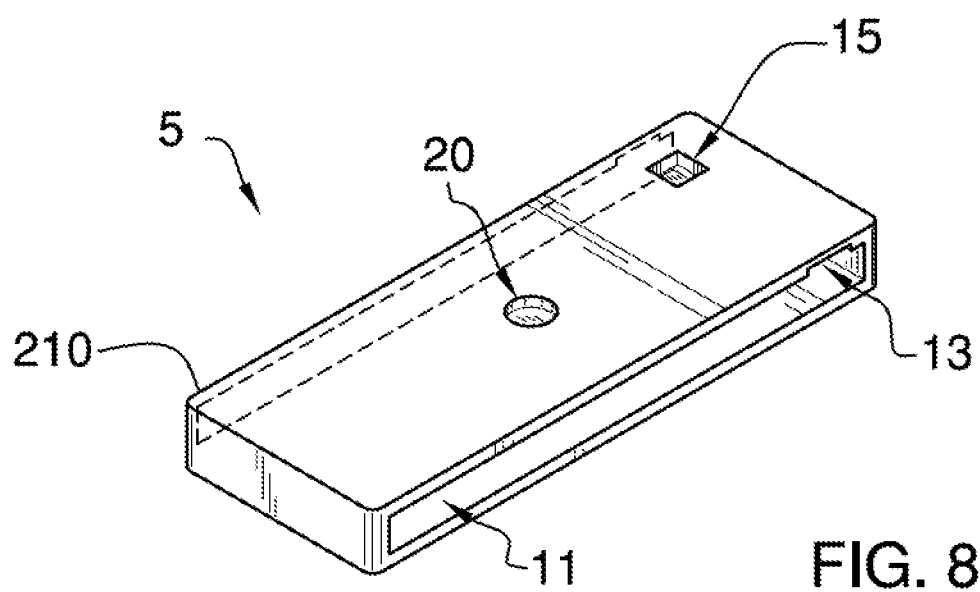
FIG. 8 is a top isometric view of a second embodiment of the data removal jig.
Figure 9:
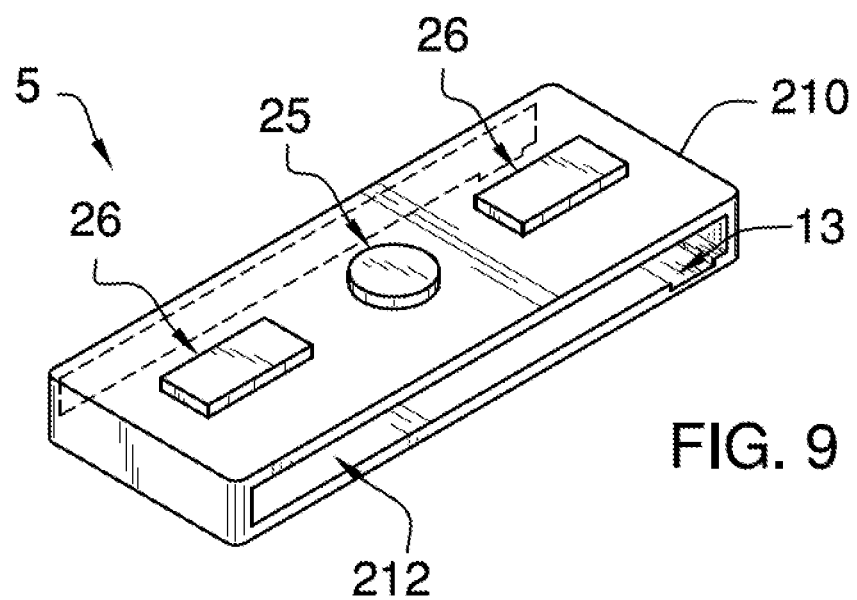
FIG. 9 is a bottom isometric view of a second embodiment of the data removal jig.
Figure 10:
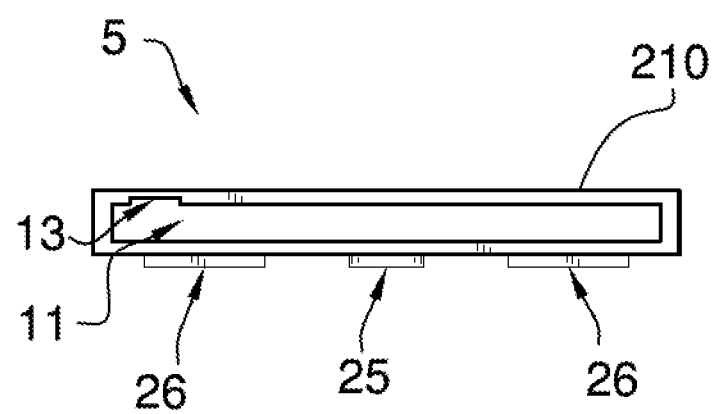
FIG. 10 is a front side view of the second embodiment of the data removal jig.
Figure 11:
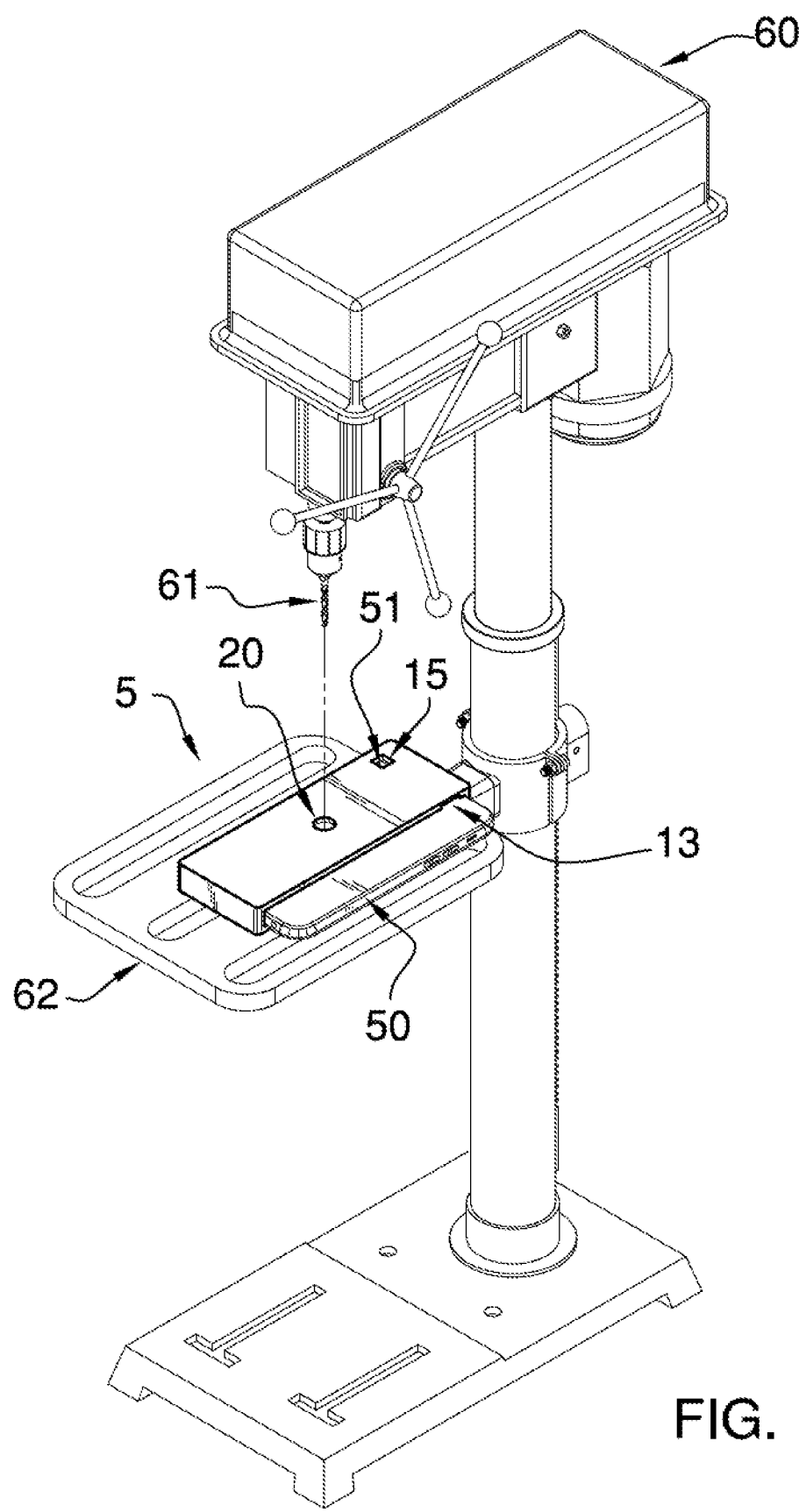
FIG. 11 is a top isometric in use view of the data removal jig positioned on a drill press such that the drill bit of the drill press is vertically aligned above the pilot hole.
Figure 12:
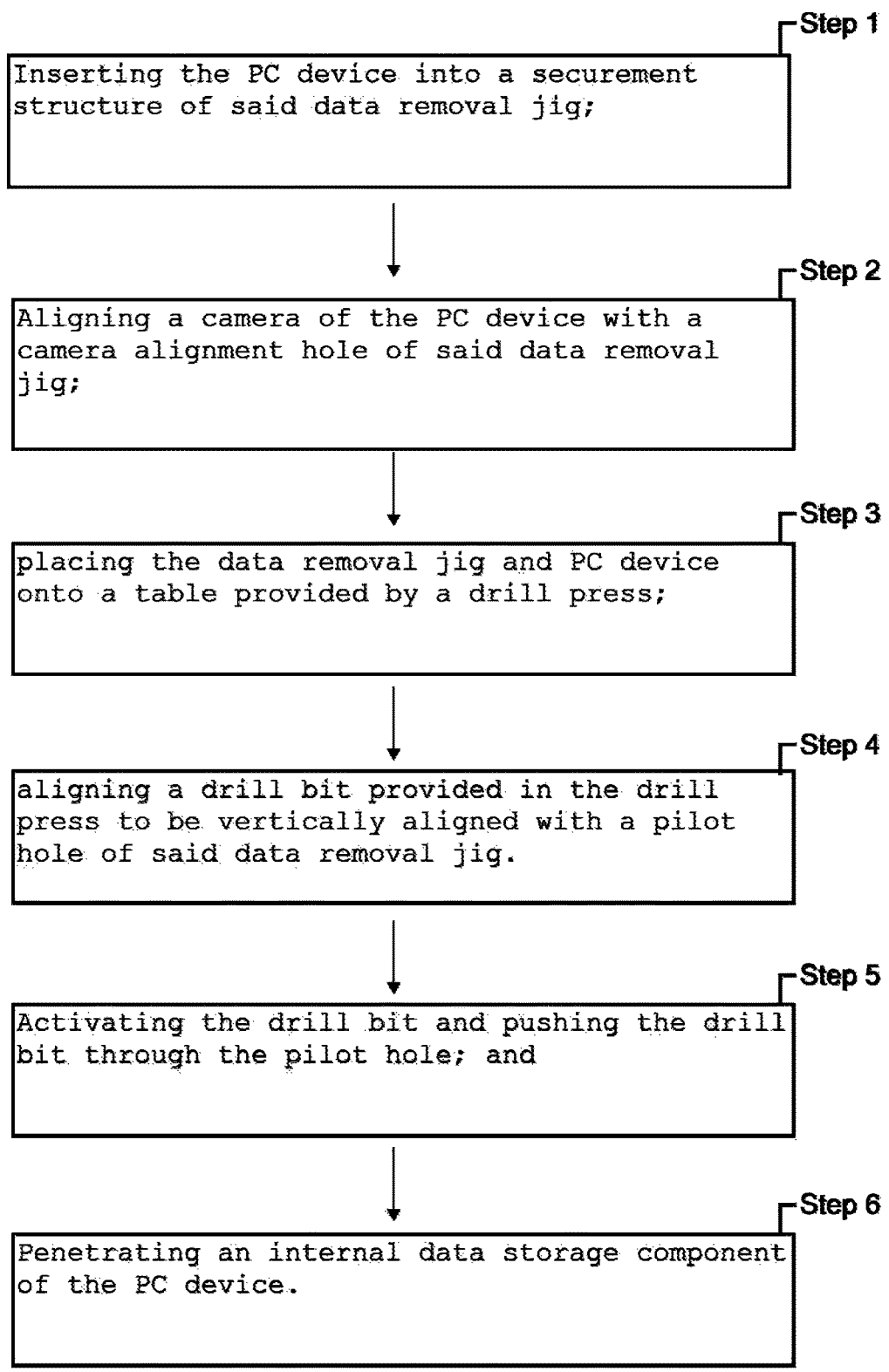
FIG. 12 is a diagram showing a method of using the data removal jig.

In a second embodiment of the present invention the geometric configuration of the securement structure forms an open-ended tubular structure 210, as shown in FIGS. 8, 9, and 10. The open-ended tubular structure 210 comprises the plurality of sides wherein the front side provides the first insert opening 11 and the rear side provides a second insert opening 212. It is anticipated that the pair of end sides may alternatively provide the first insert opening 11 and second insert opening 12. The height and width of the second insert opening 12 is substantially equal to the height and width of the first insert opening 11, respectively. In the second embodiment of the present invention the front side and rear side provide the first insert opening 11 and second insert opening 12, respectively. Each side, with the exception of the sides that provide the first insert opening 11 and second insert opening 12, preferably comprises a substantially uniform thickness, relative to one another other, to bolster structural rigidity of the open-ended tubular structure 210 and prevent distortion and plastic deformation. However, it is anticipated that the open-box structure 110 may alternatively provide a plurality of negative spaces along the internal and external surfaces.

While the embodiments of the invention have been disclosed, certain modifications may be made by those skilled in the art to modify the invention without departing from the spirit of the invention.

The invention claimed is:

1. A data removal jig comprising:
   a. a securement structure;
      wherein the securement structure further comprises a plurality of sides;
      wherein the plurality of sides includes a top side, a bottom side, a rear side, a front side, and a pair of end sides;
      wherein the top side, the bottom side, and the pair of end sides each comprise an interior surface and an exterior surface;
      wherein the distance between the interior surfaces of the pair of end sides and the distance between the interior surfaces of the top and bottom sides form an interior void within the securement structure;
   b. an insert opening;
      wherein the insert opening is provided in the securement structure;
   c. an alignment hole;
      wherein the alignment hole is provided in the top side of the securement structure;
   d. a pilot hole;
      wherein the pilot hole is provided in the top side of the securement structure;
   e. a lateral brace;
      wherein the lateral brace is provided in the bottom side of the securement structure.

2. The data removal jig of claim 1, wherein the top side provides a slotted recess.

3. The data removal jig of claim 1, wherein the bottom side provides one or more torsional braces.

4. The data removal jig of claim 1, wherein the alignment hole is provided in a predetermined position such that it is substantially aligned with a camera provided by a PC device after said PC device is placed within the securement structure.

5. The data removal jig of claim 1, wherein one or both of the end sides of the pair of end sides provide one or more secondary slotted recesses.

6. The data removal jig of claim 1, wherein the pilot hole is aligned with an flash memory chip of a PC device after the PC device is placed within the securement structure.

7. The data removal jig of claim 1, wherein the interior surfaces of the top side, bottom side, and each end side are substantially in contact with the PC device after the PC device is properly inserted within the securement structure.

8. The data removal jig of claim 1, wherein the top side and bottom side are of substantially equal size and each substantially span within planes that are substantially parallel and offset from each other.

9. The data removal jig of claim 1, wherein the front side and rear side are of substantially equal size and each substantially span within planes that are substantially parallel and offset from each other.

10. The data removal jig of claim 1, wherein each end side of the pair of end sides are of substantially equal size and each substantially span within planes that are substantially parallel to each other and offset from each other.

11. The data removal jig of claim 1, wherein the top side and bottom side are each connected to the pair of end sides.

12. A data removal jig comprising:
 a. a securement structure;
  wherein the securement structure further comprises plurality of sides;
  wherein the plurality of sides includes a top side, a bottom side, a rear side, a front side, and a pair of end sides;
  wherein the top side, bottom side, and pair of end sides each comprise an interior surface and an exterior surface; and
  wherein the distance between the interior surfaces of the pair of end sides and the distance between the interior surfaces of the top and bottom sides form an interior void within the securement structure
 b. an insert opening;
  wherein the insert opening is provided in the securement structure;
 c. an alignment hole;
  wherein the alignment hole is provided in the top side of the securement structure;
 d. a pilot hole;
  wherein the pilot hole is provided in the top side of the securement structure;
  wherein the pilot hole is aligned with an flash memory chip of a PC device after the PC device is placed within the securement structure;
 e. a lateral brace;
  wherein the lateral brace is provided on the bottom side of the secure structure.

13. The data removal jig of claim 12, wherein the top side provides a slotted recess.

14. The data removal jig of claim 12, wherein the bottom side provides one or more torsional braces.

15. The data removal jig of claim 12, wherein one or both of the end sides of the pair of end sides provide one or more secondary slotted recesses.

16. The data removal jig of claim 12, wherein the interior surfaces of the top side, bottom side, and each end side are substantially in contact with the PC device after the PC device is properly inserted within the securement structure.

17. The data removal jig of claim 12, wherein the top side and bottom side are of substantially equal size and each substantially span within planes that are substantially parallel and offset from each other.

18. The data removal jig of claim 12, wherein the front side and rear side are of substantially equal size and each substantially span within planes that are substantially parallel and offset from each other.

19. The data removal jig of claim 12, wherein each end side of the pair of end sides are of substantially equal size and each substantially span within planes that are substantially parallel to each other and offset from each other.

20. The data removal jig of claim 12, wherein the top side and bottom side are each connected to the pair of end sides.

21. A method for using a data removal jig to remove data from a PC device, comprising:
 a. inserting the PC device into a securement structure of said data removal jig;
 b. aligning a camera of the PC device with a camera alignment hole of said data removal jig;
 c. placing the data removal jig and PC device onto a table provided by a drill press;
 d. aligning a drill bit provided in the drill press to be vertically aligned with a pilot hole of said data removal jig;
 e. activating the drill bit and pushing the drill bit through the pilot hole;
 f. penetrating an internal data storage component of the PC device.

\* \* \* \* \*